FRANCES & WOODS.
Tobacco Pipe.
No. 2,506. Reissued March 12, 1867.
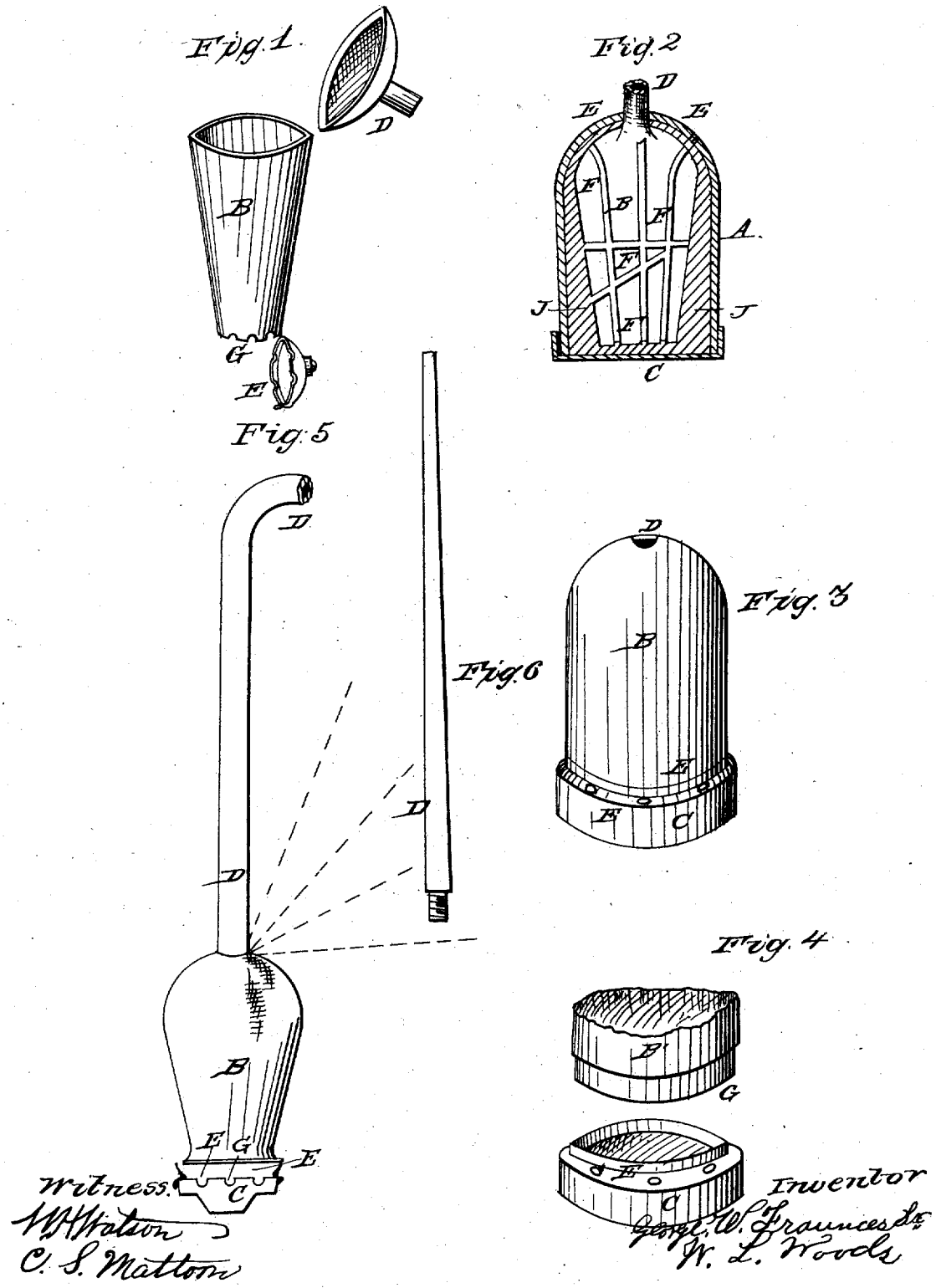
N. PETERS, Photo-Lithographer, Washington, D. C.

UNITED STATES PATENT OFFICE.

GEORGE W. FRANCES AND W. L. WOODS, OF WASHINGTON, DISTRICT OF COLUMBIA, ASSIGNORS TO W. L. WOODS, OF SAME PLACE.

TOBACCO-PIPE.

Specification forming part of Letters Patent No. 47,199, dated April 11, 1865; Reissue No. 2,506, dated March 12, 1867.

*To all whom it may concern:*

Be it known that we, G. W. FRANCES and W. L. WOODS, of Washington, District of Columbia, have invented a new and Improved Tobacco-Pipe; and we do hereby declare that the following is a full and exact description thereof, reference being had to the accompanying drawings, making a part of this specification.

The nature of our invention consists in constructing a tobacco-pipe with an inverted bowl, B, so that when it is in use the bowl B is vertical, with its opening G down, where the fire is applied, and the vent or stem D is at the top, wherein the tobacco is burned up to the vent or stem D, instead of down to the vent, as in ordinary tobacco-pipes. The cavity or chamber of the bowl B must be conical in shape, with the apex down, to prevent the tobacco from falling down. The tobacco, when in a state of combustion in this peculiarly-shaped bowl B, by reason of its conical form, has a tendency to swell up to the vent or stem D, allowing the ashes only to drop down into or against the cap C as fast as the tobacco is consumed. The surface of the cavity or chamber of the bowl B may be grooved, spurred, or set with pins to aid in holding the tobacco up to its proper place. Any moisture coming from the stem or generating in the bowl, naturally seeking a level, will take its course down the sides of the chamber or cavity and be absorbed by the ashes; and the sides of the cavity may be grooved, so as to facilitate the descent of such moisture or fluid thus forming. The stem or vent D may join the bowl B at any angle practicable. The cap C, which closes the opening G, is perforated with air-holes E, and is so constructed that it will prevent the escape of the ashes and admit the air freely into the bowl B. It may be made to close into or over the mouth of the bowl, and it may be made to extend any distance up the sides of the bowl B, or to cover it entirely, Fig. 2, so as to form a case, A, with sufficient air-chamber J; or the bowl may be grooved so as to form air-passages F, so as to allow the air to pass through from the air-holes E to feed the combustion of the tobacco in the chamber of the bowl B. This peculiar form of our invention is intended to be worn in the pocket and smoked with a flexible stem.

Our invention may be made in a substantial manner out of any suitable material and of any practicable size, solid or in sections, firmly joined, or jointed and adjustable, as each peculiar modification may require. The bowl B and stem D may be of one solid piece. It may be made of clay or lined with clay, Fig. 5.

Our pipe, in its manufacture, may be varied by any changes or modifications growing out of and harmonizing with its general form and peculiar characteristic—that of a tobacco-pipe with an inverted bowl—and when constructed as above described it will, when in use, consume the tobacco with its constituents intact, and will not decompose the tobacco, distilling, accumulating, and concentrating nicotine in the bowl, but will give the full wealth of the tobacco to the smoker.

We claim as our invention—

1. A tobacco-pipe having an inverted bowl, with the stem or vent at the top and the opening at the bottom, substantially and for the uses and purposes as above described.
2. The inverted conical bowl B, combined with the cap C, with its air-holes E, substantially as described, Fig. 5.
3. The conical bowl B, combined with the case A, substantially as described, Fig. 2.
4. The bowl B, solid or in sections, combined with the cap C and the vent D, substantially and for the uses and purposes as above described.

GEORGE W. FRANCES.
W. L. WOODS.

Witnesses:
W. H. WATSON,
C. S. MATTOON.